[19] 3,634,689

| | | | |
|---|---|---|---|
| [72] | Inventors | Masakazu Ejiri<br>Hachioji-shi;<br>Akira Kamoi, Musashino-shi; Toshio<br>Numakura, Kodaira-shi; Kenichi Isoda,<br>Kokubunji-shi; Ryutaro Mori, Kodaira-shi,<br>all of Japan | |
| [21] | Appl. No. | 818,454 | |
| [22] | Filed | Apr. 22, 1969 | |
| [45] | Patented | Jan. 11, 1972 | |
| [73] | Assignee | Hitachi, Ltd.<br>Tokyo, Japan | |

[54] AUTOMATIC POSITION OR CONDITION CONTROL DEVICES USING RELATIVE ROTATION, LINEAR POSITIONING, AND MAGNIFICATION
10 Claims, 20 Drawing Figs.

[52] U.S. Cl.................................................. 250/201,
250/202, 250/203, 250/204, 250/209, 250/220
[51] Int. Cl.......................................................... G01j 1/20,
G01j 1/36, G05b 1/00
[50] Field of Search........................................... 250/211,
217, 224, 230, 231, 203, 201, 204, 220, 211 J, 209

[56] References Cited
UNITED STATES PATENTS

| | | | |
|---|---|---|---|
| 1,747,664 | 2/1930 | Droitcour................. | 250/203 X |
| 2,766,387 | 10/1956 | Bolsey...................... | 250/203 |
| 2,903,204 | 9/1959 | Nyman et al............. | 244/14 |
| 3,029,348 | 4/1962 | Heinz....................... | 250/221 |
| 3,105,625 | 10/1963 | Miserocchi et al....... | 226/42 |
| 3,211,912 | 10/1965 | Schwarz.................. | 250/209 |
| 3,244,889 | 4/1966 | Preston et al............ | 250/211 |
| 2,568,543 | 9/1951 | Goldsmith............... | 250/201 X |
| 2,747,456 | 5/1956 | Waller et al.............. | 250/202 X |
| 3,207,904 | 9/1965 | Heinz....................... | 250/202 |
| 2,289,242 | 7/1942 | Chance et al............ | 250/220 X |
| 2,402,405 | 6/1946 | Hurley, Jr................ | 250/220 X |
| 2,568,543 | 9/1951 | Goldsmith............... | 250/201 X |
| 2,696,565 | 12/1954 | Shockley................. | 250/201 |
| 2,919,358 | 12/1959 | Marrison................. | 250/220 X |
| 3,038,369 | 6/1962 | Davis....................... | 250/204 X |
| 3,082,363 | 3/1963 | Inaba et al............... | 250/204 X |
| 3,171,963 | 3/1965 | Bourguignon........... | 250/209 |
| 3,217,166 | 11/1965 | Weinreich................ | 250/211 X |
| 2,696,565 | 12/1954 | Shockley................. | 250/201 |

Primary Examiner—James W. Lawrence
Assistant Examiner—T. N. Grisby
Attorney—Craig, Antonelli, Stewart & Hill

ABSTRACT: An automatic condition control device comprising detecting means including at least a pair of detecting elements, such as photocells, spaced from each other and having a boundary spaced therebetween. Means are provided for supplying to the detecting means an image of the object to be measured and controlled, and the output of the detecting means is used to automatically adjust the relative position of the object or the image of the object.

Inventors
Masakazu Ejiri
Akira Kamoi
Toshio Numakura
Kenichi Isoda
Ryutaro Mori

By: Paul M. Craig, Jr.

ATTORNEY

AUTOMATIC POSITION OR CONDITION CONTROL DEVICES USING RELATIVE ROTATION, LINEAR POSITIONING, AND MAGNIFICATION

The present invention relates to devices for detecting and controlling the position of an object.

In order to control the position, velocity, moving direction or the like of a body as desired or in order to make a device trace a body in response to the position, velocity, moving direction or the like of the substance, it is generally necessary, depending on an object to be attained, to detect one or more of quantities among those representing the state of the substance such as position, velocity, acceleration, moving direction, shape, attitude, size, material composition, and structure. For this purpose, a detecting means such as a synchronous generator or a velocity responsive generator may directly be mounted on a substance body to transmit a particular quantity or state of the body, in the form of single, or the quantity of state of the body may be detected without directly touching the body by utilizing the difference in properties between the body and an environment surrounding the same. In the latter case, for example, light may be projected in a direction in which the body is likely to be present and the position of the body may be recognized by light reflected from a portion of the body when the body has a higher reflection factor with respect to light than the environment surrounding the same. Among bodies to be detected, there may be some bodies which shine by being illuminated with natural light even without intentionally projecting light thereonto, and there may be some bodies which are self-luminous as will be the case with some of life. Where there is no distinct difference in properties between a body and an environment surrounding the same, it is possible to artificially create a difference in properties between the body and the environment by, for example preliminarily applying a luminous paint to the body or the environment, plating the body or the environment with a metal having a high-reflection factor, or incorporating a light source in either of them.

It is the primary object of the present invention to provide a position control device which is adapted to control the position of an object such as a body or a portion of such body relative to the position of the detecting means. It is important and necessary that the position control device of the present invention must include at least the following two means. The first means is a detecting means which detects a signal carrying medium, for example, light derived from an object. Such detecting means is provided with a detecting face consisting of at least two regions having different sensitivities against the signal carrying medium and the signal carrying medium is conducted to the detecting face. The second means is a control means which, in response to signals obtained as a result of detection by the above-described detecting means, controls the position of the object relative to the position of the detecting means. Such control means is operative to transfer the position of the object so that the signal carrying medium derived from the object or a specific portion of the object causes the image of the object to be moved to a predetermined region on the detecting face.

In the present invention, the term "object" is intended to include any object which can be used as an object of detection by detecting means, such object including a body, a cluster of many bodies, and an auxiliary body disposed in fixed relation with the body or cluster. The term "portion of an object to be detected" is intended to designate a specific portion which emits a signal carrying medium having specific information or intelligence about the said specific portion or intensity corresponding to said specific portion, said specific information, intelligence or intensity being distinctly different from that of the signal carrying media emitted from any other portions of the above-described object, the environment or in the region including both of the object and the environment. As will be apparent from the above set forth general description, such a portion of the object to be detected comprises one or more parts of an object, an auxiliary body associated with the object, the entirety of the object, or combination of these. The term "signal carrying medium" means an energy beam, for example, light or an electron beam that carries or can carry an intelligence conveying signal or information indicative of the condition of an object to be detected. The signal carrying medium may embody at least two signals or two levels of intensity of an energy beam different from each other which are produced by a difference between a portion of an object to be detected and any other portions. It is to be understood that one of these signals may be zero. The term "specific signal carrying medium" is used to mean that portion of signal carrying media which is derived from a detected portion of an object. It is advantageous and effective to use light as a signal carrying medium. However, it will be understood that any other signal carrying media generally used in the art such as charged particle rays, electron rays, ion particle rays, any other charged particle, laser light rays, and electromagnetic waves may be used as in the case of light as described above without departing from the scope and spirit of the present invention. In the later description, therefore, the present invention will mainly be described in detail with regard to the case of utilizing light as the signal carrying medium.

According to several embodiments of the present invention which will be described later, a light flux is projected on a portion of an object to be detected and a body or bodies surrounding the same or the environment, and the light reflected therefrom is utilized as a signal carrying medium and is focused at a suitable position on a detecting face to obtain an image. Then a signal is produced due to the difference between the position at which the image is formed and the position of a predetermined region on the detecting face to thereby energize control means. The control means actuates the detecting face and/or the object to make the positions of the image and the predetermined region on the detecting face to coincide with each other to thereby control the relative position of the object and the detecting face.

The above and other objects, and particularities of the present invention will become obvious from the following description with reference to the accompanying drawings, in which.

Several preferred embodiments of the present invention will now be described in detail with reference to the drawings.

EMBODIMENT 1

Figures 1, 2:
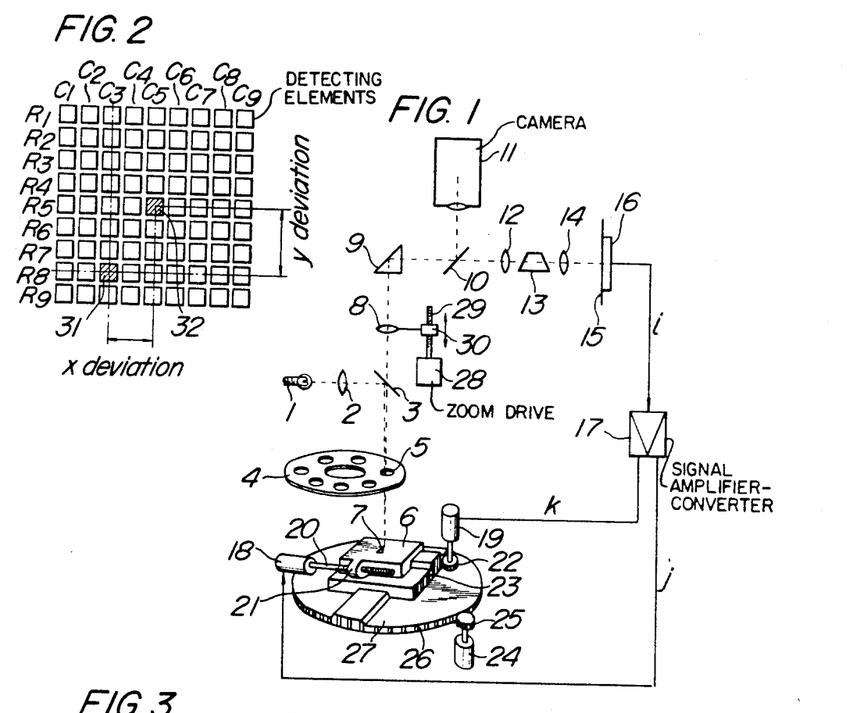
FIG. 1 is a diagrammatic view showing a schematic arrangement of an embodiment of the position control device according to the invention.
FIG. 2 is a schematic front view showing the structure of one form of a detecting face employed in the device of FIG. 1.

An embodiment shown in FIG. 1 is adapted to trace the movement of amoebas with a phase contrast microscope for the purpose of taking the amoeba movement in continuous photographs. In FIG. 1, light projected from a light source 1 is made to pass through a lens 2 and is reflected by a semitransparent mirror 3. Then the light is passed through an objective lens 5 suitably selected from a group of objective lenses accommodated in a revolver 4 and is finally led to an amoeba 7 placed on a stage 6 to illuminate the same. The light reflected from the amoeba 7 is again passed through the objective lens 5 and the semitransparent mirror 3, then through a zoom lens 8, and is deflected in its direction by a prism 9 to reach a semitransparent mirror 10. A portion of light reaching the semitransparent mirror 10 is reflected thereby to be conducted into a camera 11, while the remaining portion of the light passes through a lens 12, a trapezoidal prism 13 and a lens 14 to form an image on a screen 15. The position of the amoeba image formed on the screen 15 is detected by a detecting face 16 of detecting means disposed in close proximity to the screen 15, and the detecting face 16 generates an electrical signal $i$ corresponding to the position of the image projected on the screen 15. This signal $i$ is then conducted to control means 17 for being amplified and converted into signals $j$ and $k$ therein for causing movement of the stage 6 in a horizontal plane in the directions of X-axis and Y-axis, respectively. The signal $j$ drives an electric motor 18 which causes movement of the stage 6 in the direction of X-axis through a screw 20 and a nut 21, while the signal $k$ drives an electric motor 19 which causes movement of the stage 6 in the direction of Y-axis through a pinion 22 and a rack 23. When the amoeba image on the detecting face 16 comes to a predetermined position on the detecting face 16, a stop signal from the detecting face 16 stops the rotation of the motors 18 and 19. Thus it is possible to trace the amoeba freely moving on the stage 6 and to continuously photograph its movement at a predetermined position by the camera 11.

In the above operation, the movement of the stage 6 may be of the type of $r-\theta$ polar coordinates instead of the type of the X-Y rectangular coordinates as described above. Or more precisely, the operation may be such that the signal $i$ from the detecting face 16 drives an electric motor 24 which drives, through a pinion 25 and a gear 26, a turntable 27 having its rotary axis aligned with the optical axis of the microscope to thereby effect the positioning of the stage 6 in the direction $\theta$, and thereafter the positioning of the stage 6 in the direction $r$ can be effected by a $r$-direction driving motor (not shown) disposed independently of the turntable 27. When the $r$-direction driving motor is provided on the turntable 27 and the direction $r$ is not independent of the direction $\theta$, for example, when the x-direction driving motor 18 and the y-direction driving motor 19 as shown in FIG. 1 are utilized as the $r$-direction driving motors, the control means 17 may be provided with a computer system of simple structure for computing the signals to be supplied to the motors 18, 19 and 24 through conversion of the signal $i$ derived from the detecting face 16. The device when adapted to operate in accordance with the $r\theta$ polar coordinates may be arranged in such a manner that the image revolving means such as the trapezoidal prism 13 is rotated to rotate the projected image about the optical axis to thereby locally effect the positioning in the direction $\theta$, and thereafter the angle of rotation of the trapezoidal prism 13 is detected to drive the motor 24 to drive the turntable table 27 in turn to thereby effect the positioning of the actual body or amoeba 7 in the direction $\theta$. In any of the above cases, it is possible depending on an object to be attained, to arrange in such a manner that, instead of applying any direct control to the position of the body whose movement is to be traced, the body is allowed to freely move and the entire microscope as well as the detecting face 16 are urged to trace in response to the signal $i$ from the detecting face 16. Further, a computer system may be provided to the control means 17 to generate optimum control signals.

Hereunder, several preferred embodiments of the detecting face will be described in detail with reference to the drawings.

EMBODIMENT 2

FIG. 2 shows one form of the detecting face which comprises a multiplicity of light detecting elements such as phototransistors or solar cells arranged in the form of a matrix and disposed in a filed of vision of the above-described microscope. The magnification of the microscope is preliminarily suitably fixed by selecting the position of the zoom lens 8 in FIG. 1 or by selecting an appropriate objective lens 5 from a plurality of objective lenses disposed on the revolver 4 in FIG. 1 so that the image of amoeba described above occupies approximately the entire area of one element in the matrix. In FIG. 2, it is possible to detect in which row and which column the amoeba image exists and thus to find out its deviation in the directions of X-axis and Y-axis from a desired final position on the basis of the differences therebetween with respect to the numbers of rows and columns. Suppose for example that the image lies in a light detecting element 31 in row 8, column 3 which lies at the intersection of $R_8$ and $C_3$. Since the difference between the element 31 and an element 32 at the desired final position in row 5, column 5 is 3 in the number of rows and 2 in the number of columns, an intermediate speed signal may be supplied to the x-direction driving motor 18 and a high speed signal may be supplied to the y-direction driving motor 19. Or more precisely, an arrangement may be made so that a y-direction low normal or reverse speed signal is generated in rows $R_4$ or $R_6$, respectively, a y-direction intermediate normal or reverse speed signal in $R_3$ is generated or $R_4$ or a y-direction high normal or reverse speed signal in $R_2$, or $R_6$ and in any rows outside thereof, and so that an x-direction low normal or reverse speed signal is generated in column $C_4$ or $C_6$, and x-direction intermediate normal or reverse speed signal in $C_3$ or $C_7$, or an x-direction high normal or reverse speed signal in $C_2$, or $C_8$ and in any columns outside thereof.

Figure 3:
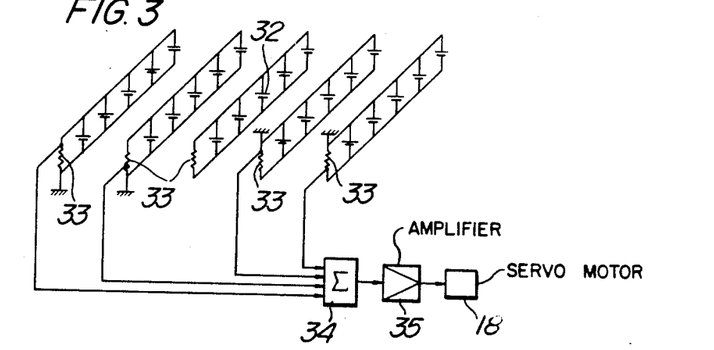
FIG. 3 is a schematic electrical circuit diagram used with the detecting face of FIG. 2.
Figures 4, 7, 8, 9, 10:
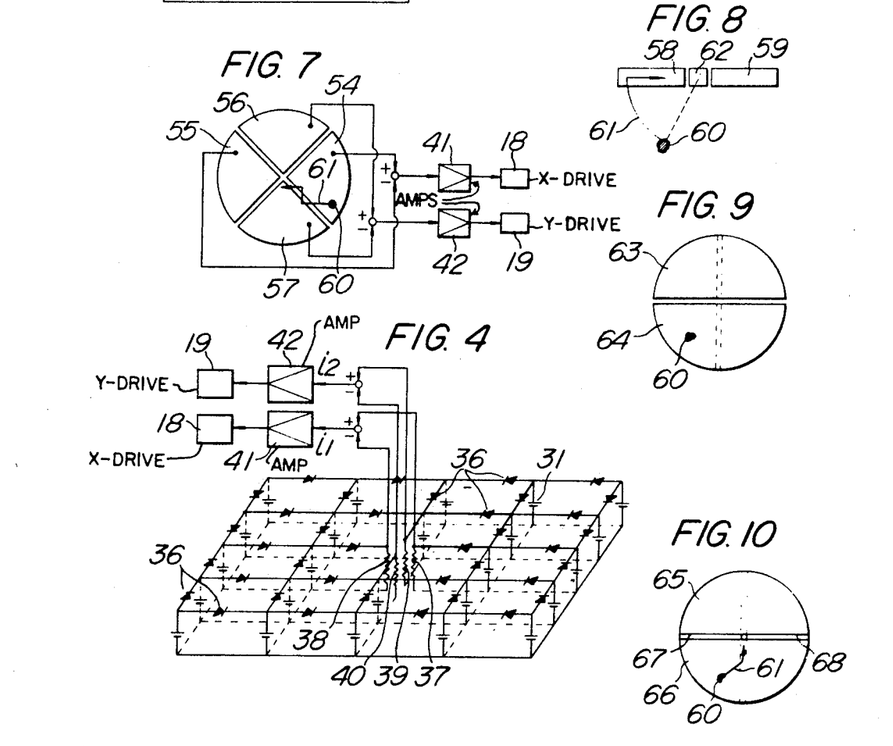
FIG. 4 is a schematic diagram of another electrical circuit for use with the detecting face of FIG. 2.
FIGS. 5 to 12 inclusive are diagrammatic views showing various other structures of the detecting face adapted for use with the device of FIG. 1.

FIG. 3 shows a case in which the light-detecting elements are solar cells. In the arrangement as shown in FIG. 3, elements in each column are connected in parallel and a resistance 33 is provided in each column. The columns disposed on opposite sides of the desired final column have their ground positions reversed with respect to each other and wiring is made in a manner that voltages are detected at successively higher positions of the resistances in the columns positioned successively remote from the desired final column. When these voltages are added by an adder 34 and amplified by an amplifier 35 and the signal output of the amplifier 35 is used to drive the DC servomotor 18 in FIG. 1, this motor 18 rotates in the normal or reverse direction depending upon the positive or negative polarity of the signal. Since further the speed of the motor 18 varies depending on the magnitude of the signal, it is possible to effect positioning of the stage 6 in the direction of X-axis in FIG. 1. It will readily be understood that the positioning in the direction of Y-axis can be effected by changing over the circuit and making a similar operation on the rows.

Where the stage 6 may be moved at a single speed, connection may be made in a manner as shown in FIG. 4 to thereby simultaneously drive the stage 6 in both directions of X-axis and Y-axis. Or more precisely, the light detecting elements may be connected in the form of a lattice and currents thereby generated are led to the central portion through unidirectional elements 36. When for example a light detecting element 31 is energized, a current thereby generated flows through paths as shown by thick lines in FIG. 4 and unbalanced voltage signals $i_1$ and $i_2$ result from the difference in voltages across resistances 37 and 38, and 39 and 40, respectively. These unbalanced voltage signals $i_1$ and $i_2$ are then amplified by amplifiers 41 and 42 to drive the x-direction driving motor 18 and y-direction driving motor 19, respectively. When the image moves into the central detecting element, there is no more flow of current through these resistances. Further when the image is greater in area than the central detecting element, magnitudes of currents flowing through these resistances balance with each other when the center of the image substantially coincides with the center of the central detecting element and thus it is possible to effect positioning in both directions of X-axis and Y-axis.

EMBODIMENT 3

Figure 5:
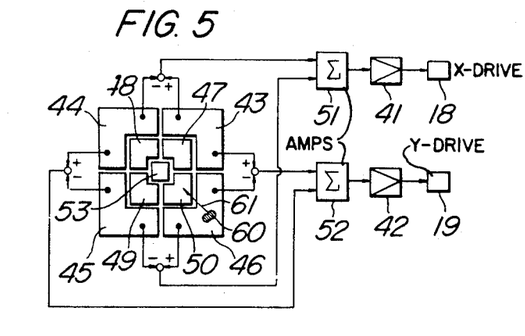

FIG. 5 shows another form of the detecting face 16 as shown in FIG. 1. The detecting face shown in FIG. 5 consists of a group of light detecting elements arranged in a manner that speed variation in two steps can be effected depending on a position at which an image 60 is projected. In FIG. 5, differential connection is provided in a manner that respective outputs of elements 43, 44, 45 and 46 disposed adjacent to each other are conducted into adders 51 and 52 and amplifiers 41 and 42, and high-speed signals of directions corresponding to respective outputs of the amplifiers 41 and 42 are supplied to the x-direction driving motor 18 and y-direction driving motor 19, respectively. Therefore, the image 60 describes a track 61 and moves into one of a group of elements 47, 48, 49 and 50 disposed interiorly of the elements 43, 44, 45 and 46. These four elements 47, 48, 49 and 50 are likewise connected in a differential manner, that is, differentially connected to the adders 51 and 52 by way of resistance attenuators, for example. Therefore, low speed signals of directions corresponding to respective outputs are supplied to the x-direction driving motor 18 and y-direction driving motor 19. Therefore, the moving speed of the image 60 is decelerated and the image 60 finally moves into a central element 53, stopping the motors. Thus, correct positioning of the stage 6 can be effected.

Figure 6:
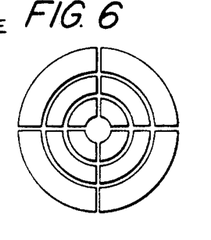

In the embodiment shown in FIG. 5, outputs of respective elements are connected in a differential fashion, but it is possible to effect similar operation by the use of a simple logical circuit. Another form of the detecting face as shown in FIG. 6 has an element arrangement similar to FIG. 5, but it is capable of effecting the positioning of the $R-\theta$ polar coordinates type as well as the positioning of the X-Y rectangular coordinates type. The detecting face of FIG. 6 is of a type in which its central element is eliminated and positioning is completed when there is no output from the detecting face or when outputs from four elements surrounding the center balance with each other.

A still another form of the detecting face as shown in FIG. 7 has an element arrangement which is obtained as it were by rotating the detecting face of FIG. 6 through an angle of 45°. In this detecting face, a differential output of detecting elements 54 and 55 opposed to each other in the direction of X-axis is amplified by an amplifier 41 and is led to the x-direction driving motor 18 to control the movement of the stage 6 in the direction of X-axis, while a differential output of detecting elements 56 and 57 opposed to each other in the direction of Y-axis is amplified by an amplifier 42 and is led to the y-direction driving motor 19 to control the movement of the stage 6 in the direction of Y-axis. When therefore an image 60 is present on the element 54 as shown, an unbalance in the outputs in the direction of X-axis causes the image 60 to move to the left and into the element 57. By the movement of the image 60 into the element 57, the signal due to unbalanced outputs in the direction of X-axis disappears and a signal due to unbalanced outputs is now generated in the direction of Y-axis to move the image 60 upwardly. In this manner, the image 60 moves towards the center of the detecting face while describing a track 61. When the image 60 reaches the center, outputs of the elements balance with each other and desired positioning of the stage 6 can be effected.

EMBODIMENT 4

FIG. 8 shows a further form of the detecting face in which detecting elements 58, 59 and 62 are arranged on a straight line and any other elements are eliminated. This arrangement can conveniently be used with the positioning of the $r-\theta$ polar coordinates type. Or more precisely, no information whatsoever can be obtained from the detecting face when an image 60 is at a position as shown, but rotation of the stage 6 in one direction causes the image 60 to reach one of the detecting elements 58 and 59 along a track 61 to thereby generate a signal. It may be so arranged that when the image 60 moves into the element 58 as shown in FIG. 8, the signal from the element 58 causes the stage 6 to stop its rotation and at the same time the stage 6 is moved in the radial direction until the image 60 moves into the central element 62. In this case, the element 62 may be eliminated when the elements 58 and 59 are connected in a differential fashion as described previously.

EMBODIMENT 5

FIG. 9 shows a still another form of the detecting face which has an element arrangement different from the detecting element arrangement as described above. In the detecting face of FIG. 9, two elements 63 and 64 of semicircular shape are connected in a differential fashion or a simple logical circuit is employed so as to move an image 60 in the direction of Y-axis, for example, towards an interface between the two elements 63 and 64. Then the light detecting elements are rotated through an angle of 90° as shown by arrow until the interface comes to a position as shown by broken lines. When thereafter the circuit is changed over to drive the x-direction driving motor, the image 60 moves into the center of the detecting face and ceases to move.

A detecting face as shown in FIG. 10 acts in a manner similar to that of FIG. 9. The arrangement in FIG. 10 is such that two light detecting elements 65 and 66 of semitransparent nature are disposed in a manner to divide the field of vision on the detecting face into halves and two nontransparent light-detecting elements 67 and 68 of similar shape are disposed therebelow at right angles with respect to the elements 65 and 66. An image 60 at a position as shown in FIG. 10 energizes the semitransparent light-detecting element 66 and at the same time passes through the element 66 to also energize the nontransparent light-detecting element 67. A signal generated from the former to urge the image 60 upwardly in the direction of Y-axis and a signal from the latter to urge the image 60 to the right in the direction of X-axis cause the image 60 to move towards the center of the detecting face along a track 61.

Figures 11, 12, 13A, 13B, 14, 15A, 15B:
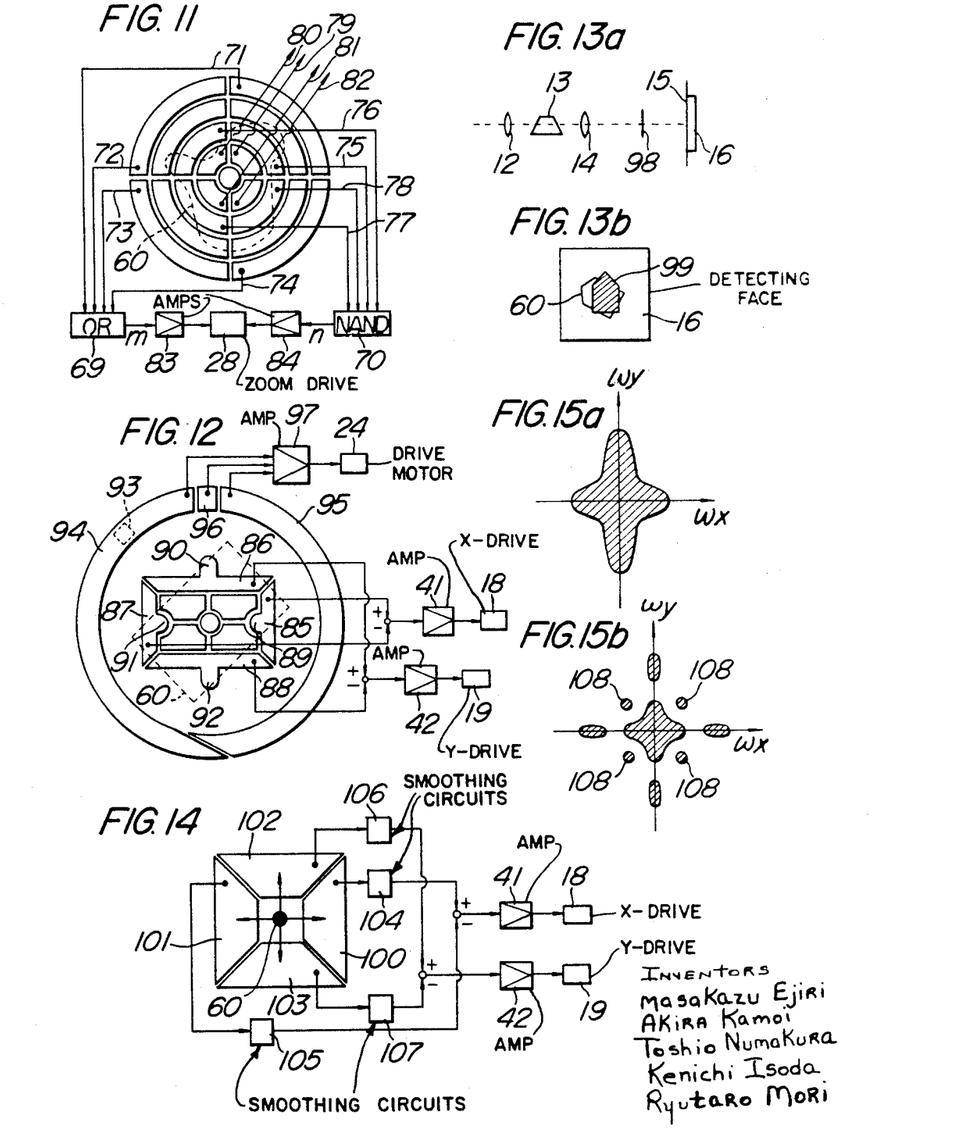
FIGS. 13a and 13b are diagrammatic views of part of another embodiment according to the invention.
FIG. 14 is a diagrammatic view showing still another form of the detecting face and an associated electrical circuit for the purpose of controlling a swinging body.
FIGS. 15a and 15b are explanatory views showing false images of a detected body.

In any of these methods as described above, a plurality of detecting elements are disposed on a detecting face and an independent detecting element is disposed at the center of the detecting face so that an image can always be moved towards a definite position on the detecting face or the center thereof, or the central element is eliminated so that this portion serves as a boundary point of the detecting elements surrounding such portion. In the embodiment as shown in FIG. 1, the manner of control is such that the image of the body is merely moved to the predetermined position on the detecting face. However it is possible to effect more precise tracing and control by increasing continuously or stepwise the magnification of the microscope, for example, by the zoom lens 8 or the revolver 4 shown in FIG. 1 for thereby magnifying the image. This image magnification may be effected by causing the x-direction driving motor 18 and y-direction driving motor 19 to stop rotation when the image is moved to the central position on the detecting face as described above and by starting a zoom lens driving motor 28 in synchronism with the stop signal to thereby urge the zoom lens 8 by way of a screw 29 and a nut 30. In this case, there is no possibility that the image gets out of the field of vision even if it is magnified because the image is preliminarily disposed at the center of the field of vision. FIG. 11 shows one form of the structure of the detecting face for use with such case and such detecting face can be operated by effecting suitable circuit changeover similar to that for one as shown in FIG. 6. Now, the present embodiment of the detecting face shown in FIG. 11 will be described.

EMBODIMENT 6

In FIG. 11, outputs of elements 71, 72, 73 and 74 are passed through an OR-circuit 69 to be derived therefrom as an image minifying signal $m$, which is supplied to the zoom lens driving motor 28 through an amplifier 83. Therefore the image is minified if any one of the four elements has its output. In other words, the elements 71–74 are operative to define an upper limit region of the image. On the other hand, outputs of elements 75, 76, 77 and 78 are passed through a NAND-circuit 70 to be derived therefrom as an image magnifying signal $n$, which is also supplied to the zoom lens driving motor 28 through an amplifier 84. Therefore the image is magnified if any one of these four elements has its output. In other words, the elements 75–78 are operative to define a lower limit region of the image. When therefore the image moved into the center of the detecting face is magnified to the upper limit region while the function of the lower limit region is kept suppressed, and the zoom lens driving motor 28 is reversed in its direction of rotation by a signal from the upper limit region while at the same time the function of the lower limit region is restored, the image is positioned intermediate between the lower limit region and the upper limit region and thereafter is continuously maintained to have a suitable size between the two regions. Any deviation of the image which may then take place in the directions of X-axis and Y-axis can be corrected in a manner similar to that described with reference to FIG. 5. For example, adjacent ones of elements 79, 80, 81 and 82 disposed interiorly of the elements 75, 76, 77 and 78 may be connected in a differential fashion and control may be made so that outputs from the elements 79–82 balance with one another. In FIG. 11, the image 60 has an appropriate size, but is shown at a position deviated to the right in the direction of X-axis and to the lower side in the direction of Y-axis. FIg. 11 shows a state in which controlled movement of the image 60 towards the center is being effected through balancing of the outputs of the elements 79–82.

The above description has referred to a case of an amorphous body of indefinite shape such as an amoeba. It will however be understood that the method described above is also applicable to the control of a figurate body. In other words, an image of a figurate body is likewise moved to the center of a detecting face according to the above-described method, is then magnified and is controlled to have a size which may fall between an upper limit region and a lower limit region. When however a particular body is figurate and its size is previously known, there may be a case, depending on an object to be attained, in which there is no necessity of continuously controlling the position of the image. In such a case, the image may be magnified, for example, in two steps in a manner that the image is moved to the center with a first and small magnification and then magnification is changed over to a second and large magnification. In this case, it may be so designed that the size of the image becomes substantially the same with the size of a detecting element arrangement on the detecting face. Such embodiment of the detecting face will now be described with reference to FIG. 12.

EMBODIMENT 7

A case with a body of rectangular shape will be described by way of example. It is so designed that the size of a magnified image 60 of the rectangular body becomes substantially the same as the size of a rectangle formed by the outer peripheries of detecting elements 85, 86, 87 and 88. When now the image 60 is at a position as shown in FIG. 12 and outputs of the opposed elements 85–88 balance with each other due to differential connection therebetween, the $x$-direction driving motor 18 and the $y$-direction driving motor 19 are held from rotation and the image 60 is also held from movement. The elements 85–88 are provided with respective projections 89–92 which are so arranged that signals effective for control in the directions of X-axis and Y-axis can be derived therefrom even if the longitudinal axis of the image 60 when magnified is at an angle of 90° with the longitudinal axis of the rectangle formed by the detecting elements 85–88. By virtue of such arrangement, it is possible to effect precise positioning of the body in the directions of both of X-axis and Y-axis by the utilization of its magnified image.

There may be a case in which it is desired to fix an angle of rotation of a body to be traced in addition to the positioning thereof in the directions of X-axis and Y-axis. In such a case, control may be effected by the utilization of asymmetry of such body. In the case as shown in FIG. 12, for example, the image 60 may be rotated by one of the methods described above and a point may be found out at which the sum of the outputs from all of the elements 85–88 gives a maximum value. In order to find out the point of the maximum value, a well-known method may be utilized according to which the elements 85–88 are connected in series to obtain an output which is the sum of their outputs, then the output is differentiated and the image is moved to the zero point. Depending on a body to be traced, an auxiliary body at a fixed position relative to the position of the body or an auxiliary mark provided for this purpose may be utilized. In the embodiment as shown in FIG. 12, an auxiliary mark 93 is disposed on an element 94 and a signal from this element 94 is amplified by an amplifier 97 to drive, for example, the $\theta$-direction driving motor 24 in FIG. 1 to turn the turntable 27 so that the image is rotated clockwise. Since an element 95 generates a signal to rotate the image counterclockwise, the image of the auxiliary mark 93 is rotated until it reaches an element 96 disposed intermediate between the elements 94 and 95 and stops thereat. This element 96 may be eliminated as described previously. In this manner, the attitude or angular position of a body can be controlled by the utilization of the position of an auxiliary mark so that the body can continuously be traced at its correct position.

EMBODIMENT 8

In another embodiment of the device of the invention as shown in FIG. 13a, a shielding plate 98 having a shape similar to the shape of a body to be traced is additionally provided in the device as shown in FIG. 1 so that the body can take a correct angular position as described in the above. When the body takes its correct angular position, the image of the body will not be projected on the screen 15 because it is shielded by the shielding plate 98. Therefore, there is no output from the detecting face 16. If the body is displaced from a desired angular position, that is, when the image 60 of the body is displaced from a shadow 99 of the shielding plate 98 as shown in FIG. 13b, there is a portion of the image 60 which is not shielded and an output is generated from the detecting face 16. It is therefore possible to find out a point at which the output is zero by directly rotating the stage or the microscope by this output or alternatively by rotating the trapezoidal prism 13 or the shielding plate 98 at first and then rotating the stage or the microscope. In this case, the detecting face may be composed of a plurality of detecting elements as described previously or of a single detecting element which covers the entire area of the face. Further, control of the body in the directions of X-axis and Y-axis can easily be effected through a suitable combination with the various methods described above. Where the angular position must be controlled more precisely, the magnification of the microscope may be further increased and the position of the shielding plate may be varied to suit the increased magnification, or alternatively the shielding plate may be replaced by a different one so as to shield the detecting face over a greater area and similar control may be made. In the manner of control in which the magnification and the size of the shielding plate are successively varied to progressively raise the precision in positioning, it may be convenient to operate in a manner that at first the image alone is rotated by the trapezoidal prism and, once the final position of rotation of the trapezoidal prism is set, the stage or the microscope or the camera is rotated through an angle corresponding to the angular position of the prism. In lieu of the shielding plate 98 referred to in this description, a slit analogous to the shape of the body may be used. In this case, a maximum value of the output from the detecting face is to be obtained.

In the above description, the invention has been described with regard to a method in which an amoeba is detected by the reflection of light therefrom, and is traced by controlling the relative positions of the amoeba and a microscope for continuously photographing the same. As described already, a body to be traced may be either amorphous or figurate and may be held in position or may be moving. The above-described method is applicable even to a case in which a body is subjected to violent vibration for any reason, for example, by an externally applied force. Assume that an image 60 swings while describing a complex locus on a detecting face as shown in FIG. 14. This swinging movement, when considered in terms of components in the directions of X-axis and Y-axis, is irregular oscillation as shown by arrows and thus pulse signals irregularly pulsating with respect to time can be derived from detecting elements 100, 101, 102 and 103. It is therefore possible to trace or control at a mean position the body swinging with respect to time by arranging in a manner that smoothing circuits 104, 105, 106 and 107 each consisting of a resistor and a capacitor are provided to average the outputs from the respective detecting elements and the circuits are connected in a differential fashion to drive the $x$-direction driving motor 18 and the $y$-direction driving motor 19 of FIG. 1. The circuits 104-107 may be replaced by counting means for counting output pulses of the elements 100-103 and in this case the frequency of swing of the body in the directions of X-axis and Y-axis may be averaged to trace and control the body at a mean position as a whole.

The above description of various embodiments has referred to the case of detecting an image of a body on the basis of the relative intensity of light. However, a difference in wavelengths or in phases may also easily be utilized by converting them into light signals of different intensities by the use of, for example, a color filter or a polarizing plate. Further, the image on the detecting face may be any of a positive or a negative picture. In this specific case, the circuit for conducting the outputs of detecting elements to the driving motors may suitably be biassed or the circuit may have its logic inverted. Further, various propagation media or signal carrying media other than light may be utilized. The propagation media may include, for example, waves having a wavelength longer than light such as infrared rays and radio waves, waves having a wavelength such as ultraviolet rays, X-rays and $\gamma$-rays, particle rays such as $\alpha$-rays, $\beta$-rays and electron rays, and longitudinal waves such as sound waves and ultrasonic waves. A body to be traced may be a source of sound waves itself or a good reflector of infrared rays. What is essential is that a propagation medium is to be selected which is most suitable for a difference in properties between a body and its environment, or an artificial distinction is to be preliminarily provided between a body and its environment so that an arbitrarily selected propagation medium is most suitable for a difference therebetween. In these cases, an appropriate image focusing means and an appropriate detecting face may be provided depending on a selected propagation medium. For example, when a body has a property of sufficiently scattering electron rays as in the case of FIG. 13, electron rays may be selected as the propagation medium, an image focusing means having a deflection coil or the like may be employed and an image may be projected on a detecting face consisting of electron ray detecting elements. If detecting elements suitable for a selected propagation medium are unavailable, the propagation medium may once be focused as an image which may then be converted into another easily detectable propagation medium. When, for example, X-rays are utilized for the detection of any defect in a substance as in the case of FIG. 15, X-rays are projected on a screen coated with, for example, a luminous paint to form a radiant image thereon and this secondarily emitted light is directly guided to a detecting face consisting of light detecting elements or indirectly guided through an intermediate light projecting and image forming means to such detecting face. In this manner, it is possible to detect X-rays by converting the X-rays into light. Particle rays such as electron rays can likewise be converted into light In these cases, the signal from the detecting face is not limited to an electrical signal but may be a pneumatic signal or a hydraulic signal used with a micro logical circuit.

The device according to the present invention finds various applications depending on an object to be attained. For example, the invention is applicable to a case in which an amoeba is continuously photographed for the purpose of observation as described above, to a case in which, for the purpose of observation of the sun or a star, its image is projected by the use of a telescope and is detected by a detecting face so as to continuously direct the telescope and associated equipment towards the sun or the star, or to a case of land surveying operation in construction works, etc. Or more precisely, the invention is applicable, for example, to exploitation of underground resources which includes detecting underground resources by the use of sound waves or the like to convert the state of deposits into an image and suitably moving a boring machine in accordance with a signal from an image position on a detecting face. The invention is also applicable to a purpose of pressure bonding lead wires onto a transistor, in which case minute base, emitter and collector electrodes on a transistor wafer are viewed through a microscope and are magnifyingly projected as a pattern and these electrodes are properly positioned for correct attachment of lead wires thereto. In this case, it will be understood that the pressure bonding means for lead wires is so constructed as to operate when the images of the transistor electrodes being the objects coincide with predetermined positions on the detecting face and the detecting face is interlocked with the pressure bonding means in a manner that the pressure bonding means follows the movement of the detecting face. Further it may be advantageous, due to such minuteness of the electrodes, that the images of the electrode portions of the transistor be at first made to coincide with the predetermined positions on the detecting face, then the images are magnified to effect accurate positioning and angular alignment, and subsequently the lead wire bonding means is actuated. The invention is also applicable to a purpose of accurate positioning of a machine tool by magnifyingly projecting the real size of the machine tool.

Although, in the above description, an image per se of a body is utilized which image is similar in its position, shape, attitude and magnitude to those of the body, a false image may be utilized in lieu of the actual image per se of a body. The term "false image" used herein is intended to designate an image which is determined with specific relation to a position, velocity, acceleration, moving direction, shape, attitude, size, material composition and structure of a body but has not a configuration similar to that of the body. Such false images include, for example, a power spectrum image of a body. This power spectrum image is an image showing a distribution of the square of Fourier coefficients of Fourier series when a gradation energy distribution of an image of a body per se is developed as Fourier series with respect to optional angular space frequency in an image plane. As is well known, the power spectrum image can be obtained by the method of diffraction and a false image peculiar to a specific body as shown in FIGS. 15a and 15b can generally be obtained. Where this false image has a shape as shown in FIG. 15a in which its length in a direction $\omega_x$ is different from its length in a direction $\omega_y$, or where the false image has a shape as shown in FIG. 15b in which dotlike image sections 108 appear at intermediate positions in the directions $\omega_x$ and $\omega_y$ and discontinuity of image occurs in both of the directions $\omega_x$ and $\omega_y$, such particular features can be utilized to detect the angular position of a body and to effect positioning of the body in respect of angle. It is also possible to select a body of peculiar shape so that its power spectrum image may be asymmetric. It is possible by the use of such false image to obtain useful information with respect to, for example, the angular position of a body as described above, and thus to make an automatic machine which is operative to automatically stack up in tiers a multiplicity of printed matters in the same direction or an automatic machine which is operative to automatically select a specific figure out of a multiplicity of figures.

Figure 16A:
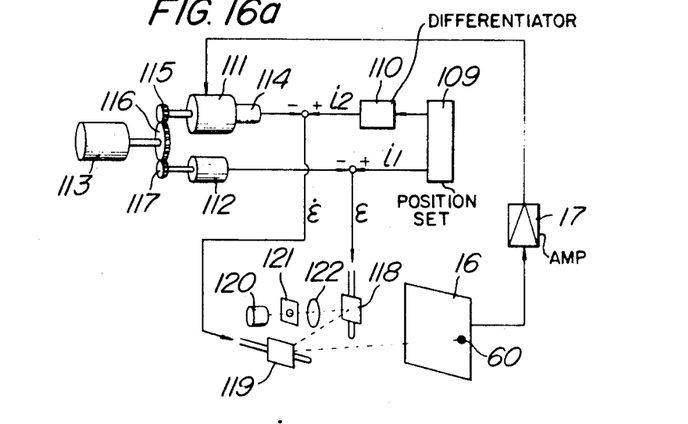
FIGS. 16a and 16b are diagrammatic views showing schematic arrangement of yet another embodiment of the present invention adapted for operation with a false image.
Figure 16B:
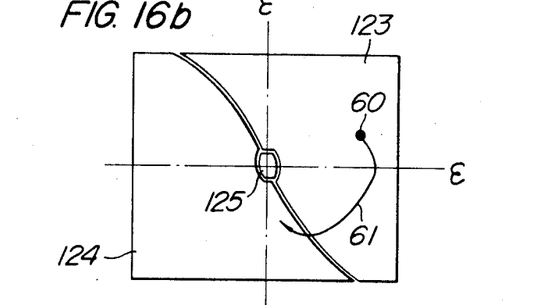

FIG. 16a shows another embodiment of the present invention which is adapted to operate with such false image. In FIG. 16a, a servomotor 111 and a speed responsive generator 114 directly coupled thereto, a potentiometer 112 and a body 113 are connected with each other through gears 115, 116 and 117. In order to trace and control the angular position of the body 113 in accordance with the command from a position setting means 109, the potentiometer 112 and the speed responsive generator 114 detect the position and the speed among the quantities of the state of the body 113, respectively, to thereby generate signals. The respective signals are compared with a position setting signal $i_1$ from the setting means 109 and a speed setting signal $i_2$ supplied through a differentiator 110 from the setting means 109 and are derived as a position error signal $\epsilon$ and a speed error signal $\epsilon'$. The position error signal $\epsilon$ and the speed error signal $\epsilon'$ are conducted to X and Y direction galvanometers 118 and 119 respectively to actuate the same. Therefore light emitted from a lamp 120 and projected through a slit 121 and a lens 122 on mirrors 118 and 119 on the respective galvanometers is deflected in X and Y directions. The light reflected from the mirror 119 forms an image 60 on a detecting face 16. If $\epsilon=\epsilon'=0$, the mirrors on the galvanometers are not deflected and the image 60 lies at the center of the detecting face 16. Then, the detecting face 16 constitutes a phase plane which has $\epsilon$ coordinate in the y-direction of X-axis and $\epsilon'$ coordinates lying in the direction. One form of such detecting face 16 is as shown in FIG. 16b. In FIG. 16b, it is assumed that a curve defining the boundary between light detecting elements 123 and 124 is, for example, an optimal changeover curve for the automatic control system. Assume that the image 60 lies at a position on the element 123 as shown, then an amplifier 17 is saturated by a signal from the detecting face 16 to supply a maximum voltage to the servomotor 111 to thereby accelerate the body 113. When the image 60 moves into the detecting element 124 while describing a track 61 as a result of movement of the body 113, the amplifier 17 is now saturated in reverse polarity by a signal from the detecting element 124 to supply a maximum voltage of reverse polarity to apply a braking action to the movement of the image 60 so that the image 60 is led towards the center of the detecting face 16. When the image 60 finally enters a central detecting element 125, the servomotor 111 may be stopped and the body 113 can thus be controlled in accordance with the desired setting. In this manner, nonlinear optimal control can simply be realized. In this case, by arranging in a manner that output of the amplifier 17 would not saturate when the image 60 moves into the central detecting element 125, it is possible to effect combined nonlinear and linear control. Through the image 60 in this embodiment is actually an image of the lamp 120, this image 60 is a false image of the body 113 since the position of the image on the detecting face 16 is related with the position and speed which are the quantities of state of the body 113. Further, signals $\epsilon''$, $\epsilon'''$,... may be used in addition to the above-described signals $\epsilon$ and $\epsilon'$ in order to materialize nonlinear optimal control in a phase space by the use of an optimal changeover curve. Other examples of the false image include an image of scattering, diffraction, interference, or the like of X-rays, $\gamma$-rays, etc., as determined by a material composition and structure of a body to be traced, and these images are utilizable in accordance with the above-described method.

Figure 17:
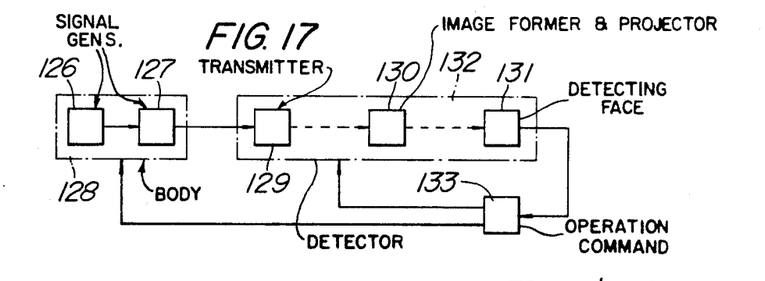
FIG. 17 is a block diagram showing an outline of the position control device according to the present invention.

To summarize, the position control device according to the present invention has a structure as shown in a block diagram of FIG. 17. In FIG. 17, reference numeral 128 designates a body in a broad sense including a signal generator, in which the body to be controlled is indicated by reference numerals 126 and the signal generator for detecting the quantity of state of the body is indicated by numeral 127. Reference numeral 132 designates detecting means which includes a signal transmitter 129 for transmitting or converting the signal from the generator 127, an image projecting and forming means 130, and a detecting face 131. Reference numeral 133 designates an operation commanding means. In FIG. 17, arrows in dotted lines, in thick solid lines and slim solid lines mean paths of signal transmission by a propagation medium, paths of signal transmission not always relying on the propagation medium, and paths of signal transmission not relying on the propagation medium, respectively. In the form of the device as shown in FIG. 1 in which light is projected on a body and reflected light is utilized for the purpose of control, the signal generator 127 is not especially provided, but in the form of the device as shown in FIG. 16a, the signal generator 127 is embodied in the potentiometer 112 and the speed responsive generator 114. The signal transmitter 129 is operative to transmit a signal intact when the signal is in the form of a propagation medium or convert the signal into another propagation medium. In the form of the device as shown in FIG. 16a, the galvanometers 118 and 119 correspond to the signal transmitter, while in the form of the device as shown in FIG. 1, the microscope corresponds to the signal transmitter. A signal corresponding to a position of an image formed on the detecting face 131 is supplied to the operation commanding means 133 to drive either or both of the body 128 and the detecting means 132 including therein the signal transmitter 129, image projecting and forming means 130 and detecting face 131 so that the image formed on the detecting face in a fixed relation with the body is controlled to take a predetermined position, attitude, size, or the like on the detecting face whereby to control the body. The operation commanding means 133 may include therein a computer system for computing the signal from the detecting face and the characteristics of other components to give an optimal operating command or may be so designed that its output is transmitted to a drive motor coupled to the body 126 by means of, for example, radio communication.

From the foregoing detailed description, it will be fully understood that the present invention is quite usefully applicable to various types of automatic control systems, automatic machines, and the like and is remarkably valuable in an industrial aspect.

What is claimed is:

1. A position control device comprising:
   detecting means including at least a pair of detecting elements and a center detecting element interposed between said pair of detecting elements;
   means for conducting to said detecting means a signal carrying medium including a signal derived from an object;
   means for varying the magnitude of the image of said object on said detecting means so that the dimension of the signal carrying medium on said detecting means is not more than the dimension of said center detecting element; and
   means for adjusting the relative position between said detecting means and said signal carrying medium on said detecting means in response to the output of said detecting means so that the signal carrying medium on said detecting means moves into said center position.

2. A position control device according to claim 1, further comprising means for magnifying the image of said object conducted to said center detecting element of said detecting means.

3. A position control device comprising:
   detecting means including at least a pair of detecting elements and a center detecting element interposed between said pair of detecting elements;
   means for conducting to said detecting means a signal carrying medium including a signal derived from an object, the area of the signal carrying medium on said detecting means being not more than the area of said center detecting element;

means for adjusting the relative position between said detecting means and said signal carrying medium on said detecting means in response to the output of said detecting means so that the signal carrying medium on said detecting means moves into said center detecting element; and means for magnifying and demagnifying the image of said object on said detecting means to facilitate placing said signal carrying medium so that it is positioned in said center detecting element.

4. A position control device according to claim 1, further comprising means for relatively rotating the position of the signal carrying medium on the detecting means measured with respect to the detecting means at varying velocities determined by the proximity of the relative rotational positions to a desired end rotational condition.

5. A position control device according to claim 1, further comprising:

means for relatively rotating the position of the signal carrying medium on the detecting means measured with respect to the detecting means at varying velocities determined by the proximity of the relative rotational positions to a desired end rotational condition; and means for linearly moving the position of the signal carrying medium on the detecting means relative to the position of the detecting means at varying velocities determined by the proximity of the relative linear positions to a desired end condition.

6. A position control device comprising:

means for conducting a signal carrying medium carrying signals derived from an object which has a main portion and an auxiliary portion;

detecting means for receiving the signal carrying medium, the detecting means including a plurality of first detecting elements corresponding to said main portion of said object, and a plurality of second detecting elements corresponding to said auxiliary portion of said object, said plurality of second detecting elements being arranged circularly around said first detecting elements in a detecting face and disposed concentrically relative to the center portion of said plurality of first detecting elements;

means for adjusting the relative position between the image of said object on said detecting means and said detecting means in response to the outputs of said first detecting elements so that the center portion of the image corresponding to said main portion of said object on said detecting means moves into the center portion of said first detecting elements; and means for adjusting the relative position between said detecting means and the image of said object on said detecting means in response to the output of said second detecting elements so that the image of said object on said detecting means is rotated around said center portion of said first detecting elements.

7. A position control device comprising:

a stage adapted to support an object having a main portion to be controlled and an auxiliary portion;

linear movement means operatively connected to said stage for causing linear movement of the stage;

rotational movement means operatively connected to said stage for causing rotational movement of the stage;

detecting means including a detecting face comprising a plurality of first photosensitive elements corresponding to said main portion of said object, and a plurality of second photosensitive elements corresponding to said auxiliary portion of said object and being arranged circularly around said first photosensitive elements and concentrically relative to the center portion of said plurality of first photosensitive elements;

light conducting means for conducting light derived from the object to be controlled to the detecting face of said detecting means so as to urge the portion of the image formed by the light on said detecting face and corresponding to said auxiliary portion of said object into one of said second photosensitive elements of said detecting face;

driving means for driving said linear movement means in response to the outputs from said first photosensitive elements; and driving means for driving said rotational movement means in response to the outputs from said second photosensitive elements so that the image of said object formed by the light on said detecting face is rotated about the center portion of said plurality of first photosensitive elements.

8. A position control device comprising:

a stage adapted to support an object having a main portion to be controlled;

linear movement means operatingly connected to said stage for causing linear movement of the stage;

rotational movement means operatingly connected to said stage for causing rotational movement of the stage;

means for conducting light derived from the object to be controlled;

means for varying the magnitude of the image of said object formed by the light to a desired magnitude;

detecting means including a plurality of photosensitive elements for receiving the light, said plurality of photosensitive elements including at least one inner photosensitive element and being arranged in a shape such that the outer periphery of the photosensitive elements surrounding said inner photosensitive element has substantially the same geometry as the contour of the image formed by the light and corresponding to said main portion of the light;

driving means for driving said rotational movement means to reduce a rotational error between the detecting means and the image of the object formed by the light to zero; and driving means for driving said linear movement means in response to the outputs from said photosensitive elements so that the contour of the image corresponding to the main portion of the object coincides substantially with the outer periphery of the entire photosensitive elements.

9. A position control device comprising:

detecting means consisting essentially of a pair of closely spaced striplike detecting elements disposed opposite to each other at their elongated end portions with a desired final position interposed therebetween;

means for conducting to said detecting means a signal carrying medium having a signal indicative of a condition to be measured and controlled;

rotational movement means for adjusting the relative rotational position between said detecting means and the position of the signal carrying medium conducted on said detecting means so that the relative position of the signal carrying medium on said detecting means is rotated about said final position in a detecting face including said pair of detecting elements to urge the position of the signal carrying medium on said detecting means to move into one of said detecting elements; and means for linearly adjusting the relative position between said detecting means and the position of the signal carrying medium on said detecting means in response to the output of said detecting means so that the linear position of the signal carrying medium on said detecting means moves to said final position.

10. An automatically controlling device comprising:

detecting means for detecting the position and the velocity of a body to be controlled to generate detecting signals of position and velocity;

comparing means for comparing the detecting signals with preset position and velocity signals, respectively, to generate deviation signals of position and velocity;

deflection means for deflecting light in $x$- and $y$- directions in response to the deviation signals of position and velocity;

means for receiving the light and generating a signal corresponding to the position of the image formed by said light; and driving means for controlling the position and velocity of the body to be controlled to a predetermined position and velocity by utilizing the signal derived from the last mentioned means.

* * * * *